(No Model.) 2 Sheets—Sheet 2.
W. HIPPERLING.
CAN SOLDERING MACHINE.
No. 399,042. Patented Mar. 5, 1889.
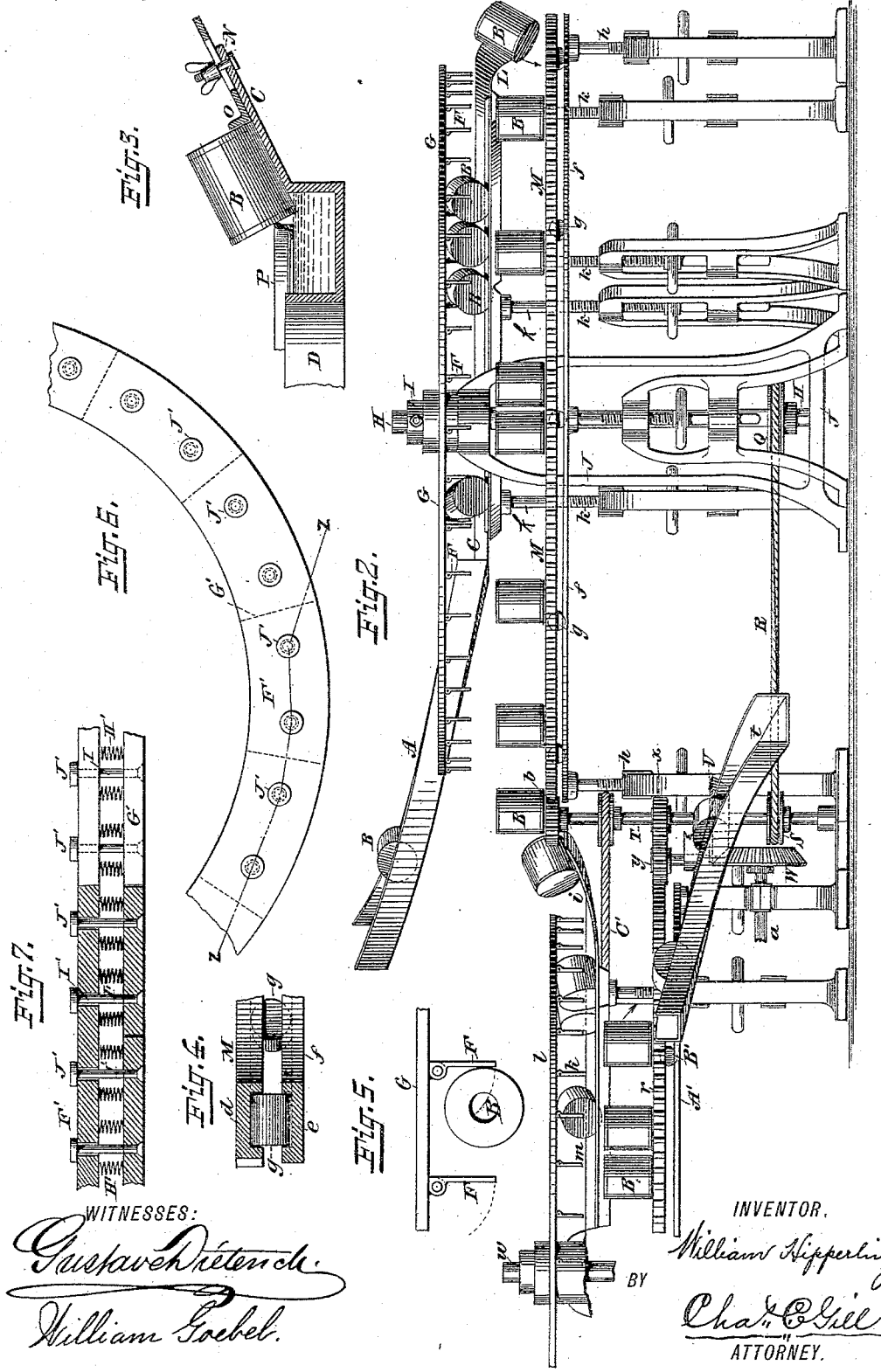
WITNESSES:
Gustave Dieterich
William Goebel
INVENTOR.
William Hipperling
BY Chas. C. Gill
ATTORNEY.

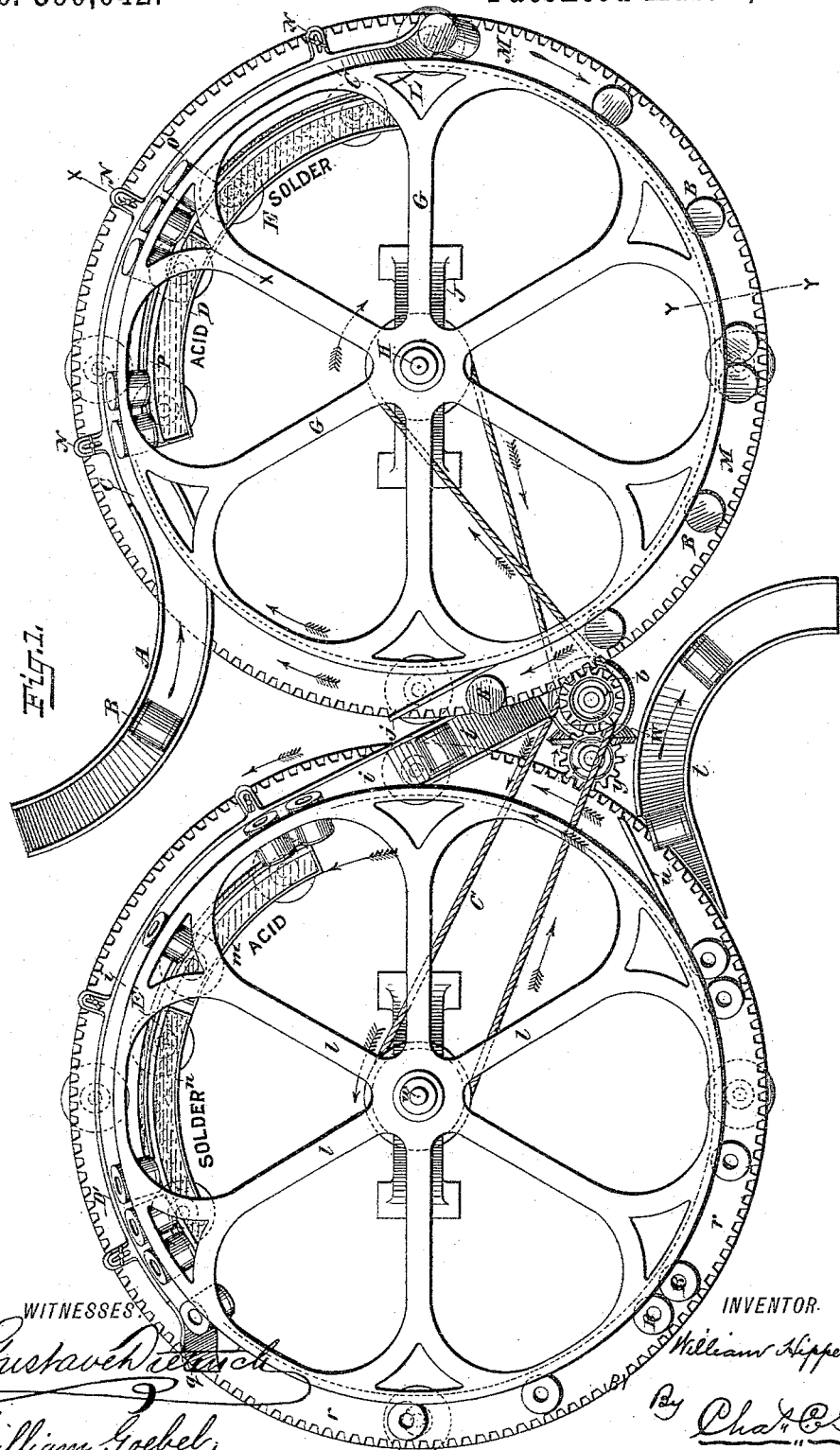

UNITED STATES PATENT OFFICE.

WILLIAM HIPPERLING, OF NEW YORK, N. Y., ASSIGNOR TO STEPHEN A. GINNA, OF PLAINFIELD, NEW JERSEY, AND RICHARD A. DONALDSON, OF BROOKLYN, NEW YORK.

CAN-SOLDERING MACHINE.

SPECIFICATION forming part of Letters Patent No. 399,042, dated March 5, 1889.

Application filed November 30, 1888. Serial No. 292,238. (No model.)

*To all whom it may concern:*

Be it known that I, WILLIAM HIPPERLING, a citizen of the United States, and a resident of New York, in the county of New York and State of New York, have invented certain new and useful Improvements in Machines for Soldering the Heads on Tin Cans, of which the following is a specification.

The invention relates to improvements in machines for soldering the heads upon the bodies of tin cans; and it consists in novel mechanism embracing a chute for feeding the cans to be soldered, a rotating wheel for moving the cans while on an incline through an acid and then a solder bath, a moving tramway for carrying the cans in a vertical position (their soldered end downward) to an additional chute, which tilts the unsoldered end downward upon a guideway, along which they are carried by another revolving wheel, the unsoldered ends of the cans being moved through an acid and then a solder bath, after leaving which the cans are carried in a vertical position upon a rotating tramway to a delivery-chute, both heads of the cans being at this time soldered, and the cans being in condition for storage or shipment.

The invention will be fully understood from the detailed description hereinafter presented, reference being had to the accompanying drawings, in which—

Figure 1 is a top view of a machine embodying the elements of the invention and showing the cans in the process of treatment; Fig. 2, an enlarged side elevation of the same, a part of the machine being broken away; Fig. 3, an enlarged vertical section on the dotted line X X of Fig. 1; Fig. 4, a like view on the dotted line Y Y of Fig. 1; Fig. 5, an enlarged detached view of a portion of the rotating frame or wheel for moving the cans through the acid and solder baths; Fig. 6, an enlarged top view of a portion of a modified form of wheel for moving the cans through the acid and solder baths, and Fig. 7 a vertical section of same on the dotted line Z Z of Fig. 6.

In the accompanying drawings, A designates the chute on which the cans are fed to the machine constituting the invention. These cans consist of a circular body with a head merely slipped on each end, one of the ends being solid and the other having the usual central aperture, through which the material to be preserved is inserted, this being a well-known form of tin can largely used for canning purposes. As the cans (lettered B) leave the feed-chute A they move upon the inclined table C, one of their ends being lower than the other, and immediately upon their assuming this position, being that clearly shown in Figs. 1, 2, and 3, they are moved through the acid and solder bath receptacles (lettered D E, respectively) by means of the depending fingers F, pivotally secured to the lower surface of the rotating frame or wheel G, which is mounted upon the vertical shaft H between the cellar I and the upper portion of the central supporting-standard, J, as shown more clearly in Fig. 2. The acid and solder baths are formed in the line of an arc of a circle, as indicated in Fig. 1, both being preferably cast in one piece and mounted upon the standards K, which, as indicated in Fig. 2, are composed of two threaded parts engaging each other, thereby rendering them adjustable as to their height, the purpose of the vertical adjustment being to move the acid and solder baths toward or from the wheel or frame G, according to the diameter of the cans to be treated.

The inclined table C extends from the chute A to the point L, where it curves outward and is given a greater inclination downward for the purpose of causing the cans B, upon arriving at this point, to assume a substantially vertical position, so that when they fall upon the rotating frame or tramway M they will be carried thereby in a vertical position, the soldered end of the can being downward.

Upon the table C, which may be in one piece with the receptacles D E, are the lugs N, to which are secured by set-screws the angle-bar O, (shown in enlarged section in Fig. 3,) which operates as a guide for the upper end of the cans while they are being moved through the acid and solder baths D E. The angle-bar or guide O is made adjustable on the table C, in order to suit the different lengths of the cans to be treated. The lower edges of the cans while being rolled on the table C enter the acid and solder baths, and their heads are thus secured in place.

In order to prevent an undue amount of the acid and solder from attaching themselves to the cans, the lower ends thereof rest against and move upon the bar P, which traverses the entire length of the baths, as indicated in Fig. 1, and operates as a stop to prevent the cans from slipping into the bath-receptacles D E. The receptacles D E will be separated by a suitable partition in order to prevent a mixture of the acid with the solder. The pivoted fingers F on the lower surface of the rotating frame or wheel G are hinged a suitable distance apart and extend downward a sufficient distance to firmly engage and move the cans B along the table C and through the bath-receptacles D E.

The rotating frame or wheel G receives its motion through the vertical shaft H, which is provided near its lower end, which is seated in the frame J, with the pulley-wheel Q, (see Fig. 2,) said wheel being connected by the belt R with a pulley, S, on the shaft T. The shaft T has secured upon it the bevel gear-wheel V, which is engaged by the similar gear-wheel, W, the latter being mounted upon the power-shaft $a$.

The rotating frame M is circular in outline and toothed upon its periphery to engage the pinion $b$, secured upon the upper end of the shaft T, as shown in Fig. 2, and said frame is provided upon its under surface with the groove $d$, as shown enlarged in Fig. 4, which corresponds with the groove $e$, formed in the supporting-frame $f$, which corresponds in form with and supports the frame M, friction wheels or rollers $g$ being placed within the grooves $d$ $e$, as illustrated. The frame $f$ is mounted upon the standards $h$, which are also adjustable vertically and are similar to the standards K, the purpose of the adjustable standards $h$ being to support the frame $f$ and to render it, with the frame, M, carried thereby, adjustable vertically to suit the different lengths of cans dropping upon it from the end L of the table C. The rotating frame M is prevented from losing its position by reason of the groove $d$ engaging the ends of the friction wheels or rollers $g$, and during the rotation of said frame M, which is caused by the engagement of the pinion $b$ with its toothed periphery, the cams B are carried in a vertical position to the upper end of the table $i$, (shown in Figs. 1 and 2,) upon which they are caused to fall by coming in contact with and being crowded from the table M by the arm $j$. (See Fig. 1.) The cans, as they fall upon the table $i$, have their upper or unsoldered ends turned downward toward the inner edge of said table, down which they roll until the fingers $k$ of the rotating wheel or frame $l$ come into contact with them and carry them along said table and through the acid and solder baths $m$ $n$, respectively, by which the heads of the cans then lowermost are effectually soldered in place upon the can-bodies. After the cans have left the acid and solder baths $m$ $n$ they are by the inclined and grooved end $q$ of the table $i$ given a substantially vertical position and allowed to drop upon the rotating frame $r$, which carries them to the delivery-chute $t$, upon which they are caused to fall by the bar $u$. (See Fig. 1.) The rotating wheel or frame $l$, carrying the pivoted fingers $k$, is similar in construction to the rotating frame G, hereinbefore described, and is mounted upon the vertical shaft $w$.

The acid and solder baths $m$ $n$ and the rotating frame $r$ are the same as the acid and solder baths D E and rotating frame M, and said frame $r$ is toothed upon its periphery and receives its motion from the pinion-wheel $x$, mounted upon the shaft T, through the intermediate wheel, $y$, as shown in Figs. 1 and 2. The frame $r$ is supported upon the stationary frame A' and friction wheels or rollers B', which frame and rollers are the same in construction as the frame $f$ and rollers $g$, hereinbefore described. The vertical shaft $w$ receives its motion from the shaft T through the belt C'. The table $i$ is provided with the guide D', similar to the guide O, hereinbefore described, and the acid and solder baths $m$ $n$ are provided with the stop-bar E', similar to the bar P, hereinbefore described as being furnished for the acid and solder receptacles D E. The portion of the machine for soldering one end of the cans is similar in construction and operation to that portion for soldering the other end of the cans, and hence it will not be necessary to give a more detailed description of the construction of the left-hand portion of the machine, that portion being identical with the portion at the right-hand end of the machine, and the acid and solder baths $m$ $n$ and the stationary frame A' being mounted upon vertically-adjustable standards similar to the standards provided for the like devices at the right-hand end of the machine. The fingers lettered F $k$ are similarly pivoted to their respective frames, G and $l$, and are arranged to fold upward toward their frames in one direction.

In Figs. 6 and 7 I illustrate a modified form of the rotating frame or wheel G, which consists of an upper continuous piece, F', and a lower piece, G', made in sections, as indicated by dotted lines in Fig. 6 and full lines in Fig. 7, the sections G' being separated from the continuous piece F' by a series of springs, H', and being sustained in position so as to be capable of vertical movement by means of the rods I', which loosely pass through apertures in the piece F', and are provided with heads J' to prevent their escape therefrom. During the rotation of the frame G, as modified according to the construction illustrated in Figs. 5 and 6, the sections G' will have a light pressure on the cans B, sufficient to move them along the table C without bruising them, and at the same time said sections G' will be capable of yielding to any irregularities in the cans, the pressure of the irregularities moving said sections upward toward the continuous piece or frame F'.

The operation of the machine will be apparent from the description above given. The cans with the heads slipped upon them move down the inclined chute A upon the inclined table C, where they are taken up by the rotating frame G and move through the acid and solder baths D E, securing the heads upon one end of said cans, after which the cans fall upon the frame M and are carried to the table $i$, down which they pass to a position where they may be taken up by the frame $l$ and carried through the acid and solder baths $m$ $n$, securing the heads upon the opposite end of said cans, upon leaving which the cans are carried by the rotating frame $r$ to the delivery-chute $t$. During the movement of the cans upon the frames M and $r$ the cans are allowed to cool. The rotating frame or wheel G and the rotating frame M travel in one direction, and the wheel $l$ and frame $r$ travel in the opposite direction, whereby the cans will be delivered at a point between the frames G and $l$—a point about on a line with the feed-chute A, though on the opposite side of the machine.

In the use of the machine described I am enabled to solder the heads upon cans rapidly, and the whole operation is accomplished in a limited space, which is an essential consideration.

In the manufacture of tin cans it is desirable and practically necessary to provide machinery of large capacity occupying a limited space, and these objects I have effectually accomplished in the construction of the machine sought to be protected hereby.

What I claim as my invention, and desire to secure by Letters Patent, is—

1. In a machine for soldering the heads upon tin cans, the inclined table upon which the cans are moved through the acid and solder baths and the rotating frame or wheel for moving said cans, combined with the acid and solder receptacles and the rotating frame for receiving the cans from said receptacles and conveying them to a point of delivery, substantially as and for the purposes set forth.

2. In a machine for soldering the heads upon tin cans, the inclined table upon which the cans are moved through the acid and solder baths and the rotating frame or wheel for moving said cans, combined with the acid and solder receptacles mounted upon vertically-adjustable standards and the rotating frame for receiving the cans from said receptacles, also mounted upon vertically-adjustable standards, substantially as set forth.

3. In a machine for soldering the heads upon tin cans, the acid and solder receptacles arranged in the arc of a circle, the inclined table on which the cans move, and the rotating frame or wheel for moving said cans, combined with the rotating frame for receiving the cans from said receptacles and having a toothed periphery, gearing for engaging said periphery, and a stationary frame for supporting said toothed frame, substantially as set forth.

4. In a machine for soldering the heads upon tin cans, the acid and solder receptacles, the inclined table on which said cans move, and the rotating frame or wheel for moving the cans, combined with the rotating toothed frame M, having groove $d$, the stationary frame $f$, having groove $e$, and the rollers $g$, substantially as set forth.

5. In a machine for soldering the heads on tin cans, the acid and solder receptacles, the inclined table on which the cans move, and the rotating frame or wheel G, having pivoted fingers F for moving the cans, combined with the rotating frame for receiving the cans from said receptacles and transmitting them to a point of delivery, substantially as and for the purposes set forth.

6. A machine for soldering the heads on tin cans, embracing in duplicate the acid and solder bath receptacles, the inclined table on which the cans move, the rotating frame or wheel for moving the cans along said receptacles, and the rotating frame for receiving the cans after leaving said receptacles, combined with means, substantially as described, for reversing the position of the cans between the times of their treatment by the duplicate parts of the machine, so as to present one head of the can to one part and the other head to the other part, substantially as set forth.

7. A machine for soldering the heads on tin cans, having duplicate parts, each embracing the following elements: the acid and solder receptacles, the rotating frame for carrying the cans through said receptacles, and the rotating frame for receiving the cans from said receptacles, combined with feed and delivery chutes for the cans and a table for receiving the cans from one of said duplicate parts and delivering them to the other of said parts, substantially as set forth.

Signed at New York, in the county of New York and State of New York, this 27th day of November, A. D. 1888.

WILLIAM HIPPERLING.

Witnesses:
CHAS. C. GILL,
R. A. PORTEOUS.